United States Patent
Gao et al.

(10) Patent No.: US 11,429,372 B2
(45) Date of Patent: Aug. 30, 2022

(54) APPLICATION PROGRAM UPDATING METHOD, APPARATUS, SYSTEM, MEDIUM AND DEVICE

(71) Applicant: Microfun Co., Ltd, Beijing (CN)

(72) Inventors: Chi Gao, Beijing (CN); Hongsong Tan, Beijing (CN); Zijian Hu, Beijing (CN)

(73) Assignee: Microfun Co., Ltd, Beijing (CN)

(*) Notice: Subject to any disclaimer, the term of this patent is extended or adjusted under 35 U.S.C. 154(b) by 37 days.

(21) Appl. No.: 17/108,318

(22) Filed: Dec. 1, 2020

(65) Prior Publication Data

US 2022/0027139 A1 Jan. 27, 2022

(30) Foreign Application Priority Data

Jul. 24, 2020 (CN) .......................... 202010725326.6

(51) Int. Cl.
*G06F 8/65* (2018.01)
*G06F 11/36* (2006.01)

(52) U.S. Cl.
CPC .............. *G06F 8/65* (2013.01); *G06F 11/362* (2013.01)

(58) Field of Classification Search
USPC ........................................................ 717/170
See application file for complete search history.

(56) References Cited

U.S. PATENT DOCUMENTS

| 8,180,845 | B2* | 5/2012 | Brendle | H04L 29/06 709/217 |
| 11,106,453 | B2* | 8/2021 | Giatilis | H04W 8/18 |
| 2009/0132998 | A1* | 5/2009 | Meijer | G06F 11/3664 717/124 |
| 2013/0311984 | A1* | 11/2013 | Kaiwar | G06F 8/65 717/172 |
| 2014/0282399 | A1* | 9/2014 | Gorelik | G06F 8/71 717/122 |
| 2015/0067167 | A1* | 3/2015 | Kuppala | H04L 67/16 709/225 |
| 2017/0192773 | A1* | 7/2017 | Trevathan | G06F 8/65 |
| 2019/0340212 | A1* | 11/2019 | Isager | G06F 8/65 |
| 2020/0097390 | A1* | 3/2020 | Gunter | H04L 41/5054 |

* cited by examiner

*Primary Examiner* — Qing Chen
*Assistant Examiner* — Clint Thatcher
(74) *Attorney, Agent, or Firm* — Maier & Maier, PLLC

(57) ABSTRACT

An application program updating method, apparatus, system, medium and device. The application program updating method provides a method of debugging a to-be-updated program logic through a development mode of a hot-update supporting client to obtain an updated program logic, then issuing the updated program logic to a back-end, and acquiring update data from the back end through a product mode of the hot-update supporting client. This allows a front-end developer to write and update simply and quickly without an assistance of any back-end developers.

20 Claims, 5 Drawing Sheets

APPLICATION PROGRAM UPDATING METHOD, APPARATUS, SYSTEM, MEDIUM AND DEVICE

CROSS-REFERENCE TO RELATED APPLICATIONS

This application claims priority to Chinese Patent Application No. 202010725326.6, filed on Jul. 24, 2020, which is hereby incorporated by reference in its entirety.

TECHNICAL FIELD

The present application relates to the field of computer technologies, and in particular, to an application program updating method, an apparatus, a system, a medium and a device.

BACKGROUND

In order to enable an application program to continuously adapt to a changing market, developers need to continuously improve the application program, that is, to constantly update the version of the application program.

Currently, development of an application program usually requires programming on a front end and a back end, respectively. However, when the development is performed on the two ends, Integrated Development Environments (IDEs) they are based on are usually different, and the used languages are also different. Therefore, when the application program needs to be updated, front-end and back-end developers need to carry out detailed negotiation before a function update in the application program can be realized.

It can be seen that because the front-end developer generally cannot write back-end codes, the current update method of programming on the front end and the back end respectively will increase a lot of communication costs, which goes against a rapid update and iteration of the application program.

SUMMARY

Embodiments of the present application provides an application program updating method, an apparatus, a system, a medium and a device, so as to solve the problem that the current update method of programming on a front end and a back end respectively will increase a lot of communication costs, which goes against a rapid update and iteration of the application program.

In a first aspect, an embodiment of the present application provides an application program updating method, where the method is applied to a front end, and the method includes:

debugging a to-be-updated program logic, through a development mode of a hot-update supporting client, to obtain an updated program logic;

issuing the updated program logic to a back end; and acquiring update data from the back end, through a product mode of the hot-update supporting client.

In a possible design, the to-be-updated program logic is written and debugged based on an integrated development environment corresponding to the front end.

In a possible design, the to-be-updated program logic is written based on a programming language corresponding to the front end.

In a possible design, the to-be-updated program logic is a program logic to be newly added and/or a program logic to be modified.

In a possible design, the issuing the updated program logic to the back end includes:

issuing the updated program logic to the back end through a data interface, where the data interface is an original interface for data interaction between the front end and the back end.

In a second aspect, the present application provides an application program updating method, where the method applied to a back end includes:

receiving an updated program logic issued by a front end;

compiling the updated program logic to obtain a back-end program logic; and sending update data to the front end through the back-end program logic.

In a third aspect, the present application further provides an application program updating apparatus, including:

a hot-update supporting client, configured to debug a to-be-updated program logic through a development mode to obtain an updated program logic;

a program issuing module, configured to issue the updated program logic to a back end; and the hot-update supporting client is further configured to acquire update data from the back end through a product mode.

In a possible design, the to-be-updated program logic is written and debugged based on an integrated development environment corresponding to the front end.

In a possible design, the to-be-updated program logic is written based on a programming language corresponding to the front end.

In a possible design, the to-be-updated program logic is a program logic to be newly added and/or a program logic to be modified.

In a possible design, the program issuing module is specifically configured to issue the updated program logic to the back end through a data interface, where the data interface is an original interface for data interaction between the front end and the back end.

In a fourth aspect, the present application further provides an application program updating apparatus, including:

a program receiving module, configured to receive a updated program logic issued by a front end;

a program compiling module, configured to compile the updated program logic to obtain a back-end program logic;

a data sending module, configured to send update data to the front end through the back-end program logic.

In a fifth aspect, an embodiment of the present application also provides a front-end device, including:

a processor; and a memory, configured to store an executable instruction of the processor;

the processor is configured to execute any one of the possible application updating methods in the first aspect by executing the executable instruction.

In a sixth aspect, an embodiment of the present application further provides a computer-readable storage medium storing a computer program thereon, where the computer program implements any one of the possible application program updating method in the first aspect when the being executed by a processor.

In a seventh aspect, an embodiment of the present application also provides a back-end device, including:

a processor; and a memory, configured to store an executable instruction of the processor;

the processor is configured to execute any one of the possible application updating methods in the second aspect by executing the executable instruction.

In an eighth aspect, an embodiment of the present application further provides a computer-readable storage medium storing a computer program thereon, where the computer program implements any one of the possible application program updating method in the second aspect when being executed by a processor.

In a ninth aspect, an embodiment of the present application further provides an application program updating system, including: the front-end device as described in the fifth aspect and the back-end device as described in the seventh aspect.

Embodiments of the present application provide an application program updating method, an apparatus, a system, a medium and a device. A to-be-updated program logic is debugged through a development mode of a hot-update supporting client to obtain an updated program logic; then the updated program logic is issued to a back end, and update data is acquired from the back end through a product mode of the hot-update supporting client. This allows a front-end developer to write and update a logic executed on the back end simply and quickly without an assistance of any back-end developer, thereby improving an efficiency of rapid update and iteration of an application program.

BRIEF DESCRIPTION OF DRAWINGS

In order to describe the technical solutions in embodiments of the present application or in the prior art more clearly, the following briefly introduces the accompanying drawings needed for describing the embodiments or the prior art. Apparently, the accompanying drawings in the following description are merely some embodiments of the present application, and persons of ordinary skill in the art may still derive other accompanying drawings from these accompanying drawings without creative effort.

DETAILED DESCRIPTION OF EMBODIMENTS

Figure 1:
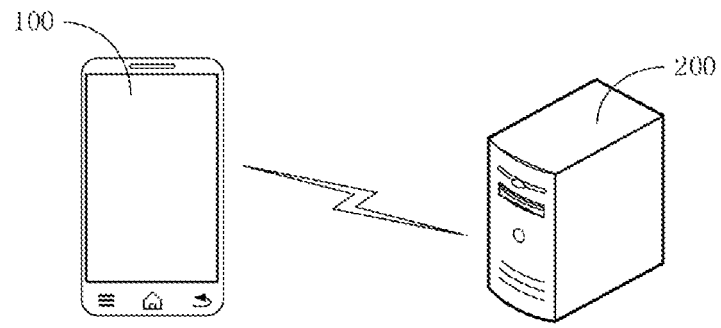
FIG. 1 is a schematic diagram of an application scenario of an application program updating method according to an exemplary embodiment of the present application.

In order to make the purposes, technical solutions and advantages in embodiments of the present application more clearly, the technical solutions in the embodiments of the present application will be described clearly and completely below in combination with accompanying drawings in the embodiments of the present application. Apparently, the described embodiments are merely part of embodiments of the present application, rather than all of them. Based on the embodiments of the present application, all other embodiments obtained by those ordinary skilled in the art without paying creative effort shall fall within the scope of protection of the present application.

The terms "first", "second", "third", "fourth" and/or the like (if any) in the description, claims and the above accompanying drawings of the present application are used to distinguish similar objects, and are not necessarily used to describe specific order or sequence. It should be understood that the terms used as such are interchangeable under appropriate circumstances, so that the embodiments described herein can be implemented in orders other than those illustrated or described herein. In addition, the terms "include" and "have" and any variations thereof are intended to cover non-exclusive inclusion. For example, processes, methods, systems, products or devices that include a series of steps or units do not have to be limited to those steps or units expressly listed, but may instead include other steps or units that are not expressly listed or are inherent to the processes, methods, products or devices.

In order to enable an application program to continuously adapt to a changing market, developers need to continuously improve the application program, that is, to constantly update the version of the application program. Currently, in a process of development and maintenance of the application program, programming is usually performed on a front end and a back end, respectively. A front-end personnel generally cannot write back-end codes, so even if a very simple logic is intended to be executed on the back end, it needs to be written by a back-end personnel. It can been seen that such program update method increases a lot of communication costs; at the same time, because the logic is scattered in different projects, strict interface definitions and development documents are required to ensure consistency of the two sides. It is worth noting that the above "very simple logic" is a logic that needs to be updated frequently, for example, it may be a map in a game.

In addition, for an update of the above "very simple logic", in the prior art, the update may usually be achieved in the following three manners.

The first manner is to issue a new client installation package and let users install it. This manner is the most controllable and can be tested completely. However, it is often necessary to force the users to install, and the users may find it more troublesome; but if do not force the users, update rate will be very low.

The second manner is to implement a hot-update logic in an application program and download the latest code logic from a server, including but not limited to a script, a compiled code segment, and a compiled dynamic link library, etc. This manner can hot-update a logic that requires a high-response speed. However, it is generally banned by various issue channels, and a more complex framework (such as a script engine) is required. In addition, it is more troublesome to test for various situations.

The third manner is to place a logic on a back-end server. Each time a client sends a network request to the server for execution, the server-end logic can be updated at any time. In this way, the client remains unchanged, and the probability of having problems is relatively small. However, a front-end developer is required to have server development knowledge, and be capable of writing and coordinating server codes. In addition, a logic that requires a high-response speed cannot be supported.

To sum up, the manner of implementing hot update by issuing new logic codes to the client is generally prohibited by various platforms. If a logic that needs hot update is not complicated, and its requirement for response speed is not so high, there is no need to risk being investigated and removed by a platform. In this case, this part of the logic can be chosen to be implemented on the back end and to be called by the front end. However, the logic here has nothing to do with the back-end personnel. The back-end personnel just "helps" to implement part of the front-end's own logic on the back end. And every time the logic is changed, the front-end personnel has to re-explain a new logic and its context to the back-end personnel, so that the back-end personnel performs a specific implementation; then a front-end and back-end joint debugging is performed, and a final submission is finished together. In this case, additional communication and other costs far exceed the code logic itself.

In view of the above various problems, embodiments of the present application provide an application program updating method, an apparatus, a system, a medium and a device. A to-be-updated program logic is debugged through a development mode of a hot-update supporting client to obtain an updated program logic; then the updated program logic is issued to a back end, and update data is acquired from the back end through a product mode of the hot-update supporting client. This allows a front-end developer to write and update a logic executed on the back end simply and quickly without an assistance of any back-end developer, thereby improving an efficiency of rapid update and iteration of an application program.

FIG. 1 is a schematic diagram of an application scenario of an application program updating method according to an exemplary embodiment of the present application. As shown in FIG. 1, the application program updating method according to this embodiment can be applied to an application program updating system, where the application program updating system can include a front-end device 100 and a back-end device 200, and the front-end device 100 and the back-end device 200 are in communication connection.

Figure 2:
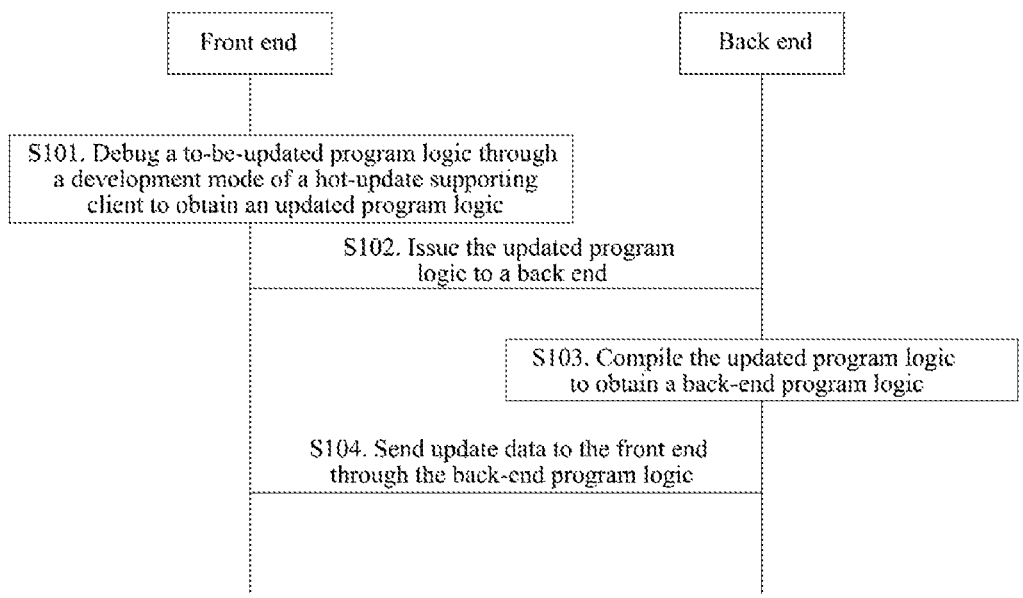
FIG. 2 is a schematic flowchart of an application program updating method according to an exemplary embodiment of the present application.

FIG. 2 is a schematic flowchart of an application program updating method according to an exemplary embodiment of the present application. As shown in FIG. 2, the application program updating method according to this embodiment includes:

S101: Debug a to-be-updated program logic through a development mode of a hot-update supporting client to obtain an updated program logic.

Specifically, in the prior art, in order to enable an application program to continuously adapt to a changing market, developers need to continuously improve the application program, that is, to constantly update the version of the application program. In the process of development and maintenance of the application program, when a logic update is required on a front end, since a front-end personnel generally cannot write back-end codes, a front-end developer needs to provide requirements to a back-end developer, and the back-end developer programs, debugs and updates a logic that needs to be updated through a back-end development environment and a back-end development language.

In this step, when an application program needs to be updated, a front-end personnel can configure the hot-update supporting client into the development mode. In this mode, the front-end personnel can update the logic in a front-end development environment, and debug the logic to acquire an updated program logic after debugging. The to-be-updated program logic may be a program logic to be newly added and/or a program logic to be modified, that is, it may be an update for a newly added function or an update for a modified function.

Optionally, the above to-be-updated program logic may be written and debugged based on an integrated development environment corresponding to the front end, so that the front-end developer can implement a development of a back end logic without changing the original integrated development environment.

In addition, the to-be-updated program logic may further be written based on a programming language corresponding to the front end, that is, the to-be-updated program logic adopts the same programming language as the programming language used on the front end for implementing a function, so that the front-end developer can implement the development of the back-end logic without learning a back-end language.

S102: Issue the updated program logic to a back end.

After the front-end developer has completed the debugging of the to-be-updated program logic and generated the updated program logic, the updated program logic can be issued to a back-end server.

Optionally, in this step, the updated program logic may be issued to the back end through a data interface between the front end and the back end. The data interface is an original interface for data interaction between the front end and the back end, that is, the front end and the back end originally adopt the data interface for data interaction.

It is worth noting that in this step, since only the front end issues the updated program logic obtained after debugging to the back end through the data interface, and there is no difference from other data transmission between the front end and the back end, there is no need to define an additional interface. This effectively avoids extra work in the prior art that programming is performed separately on the front end and the back end, and that finally an interface needs to be negotiated, and greatly improves a development efficiency.

S103: Compile the updated program logic to obtain a back-end program logic.

After the updated program logic is issued to the back end by the front end, the updated program logic is compiled on the back end to obtain a back-end program logic which can run on the back end.

S104: Send update data to the front end through the back-end program logic.

After the updated program logic is compiled and the back-end program logic is configured on the back end, update data can be sent to the front end through the back-end program logic. It is worth noting that at this time, the hot-update supporting client can be configured into a product mode, and the front end can obtain the update data from the back end through the product mode of the hot-update supporting client. It is worth noting that the product mode of the hot-update supporting client can follow a product mode logic of an existing hot-update supporting client.

Figure 3:
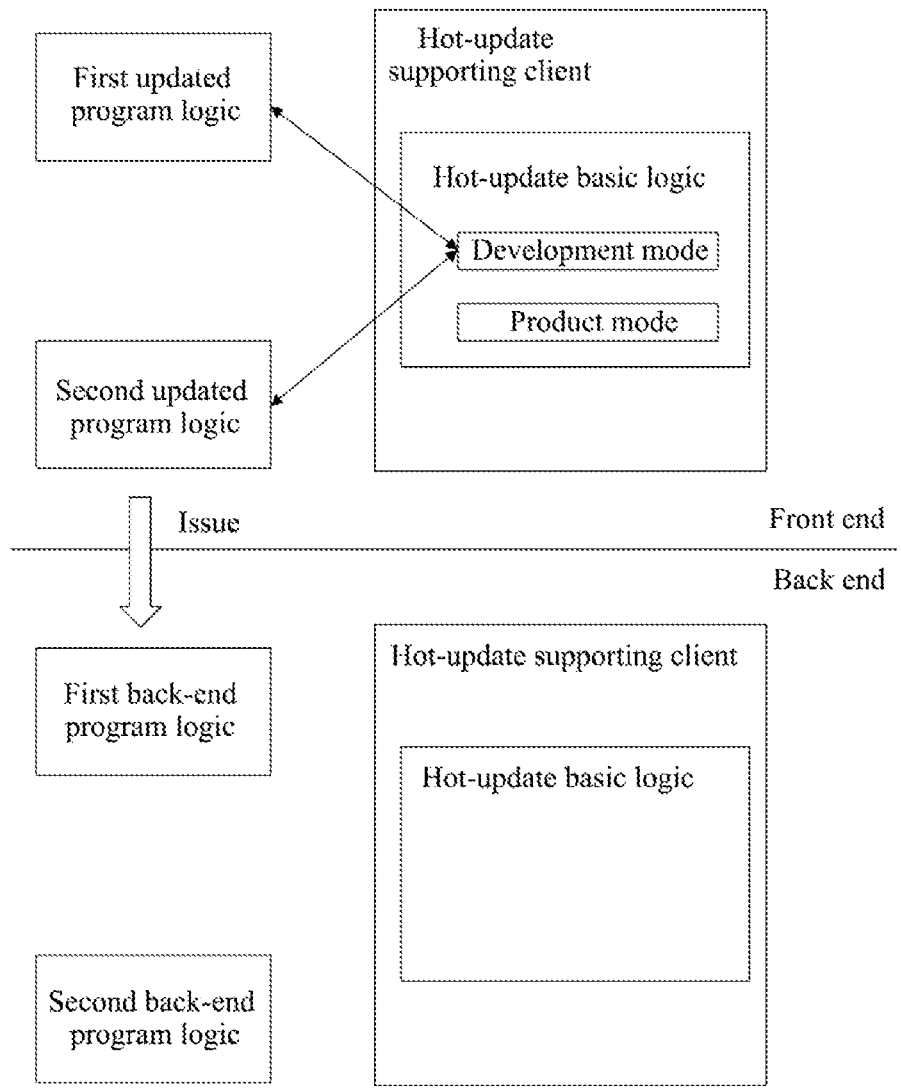
FIG. 3 is a schematic diagram of data flow in a development mode in the embodiment shown in FIG. 2.

On the basis of the above embodiment, FIG. 3 is a schematic diagram of data flow in a development mode in the embodiment shown in FIG. 2. As shown in FIG. 3, a first updated program logic and a second updated program logic in the front end may be developed and debugged in the development mode of the hot-update supporting client. Then the front end issues the first updated program logic and the second updated program logic to the back end.

Figure 4:
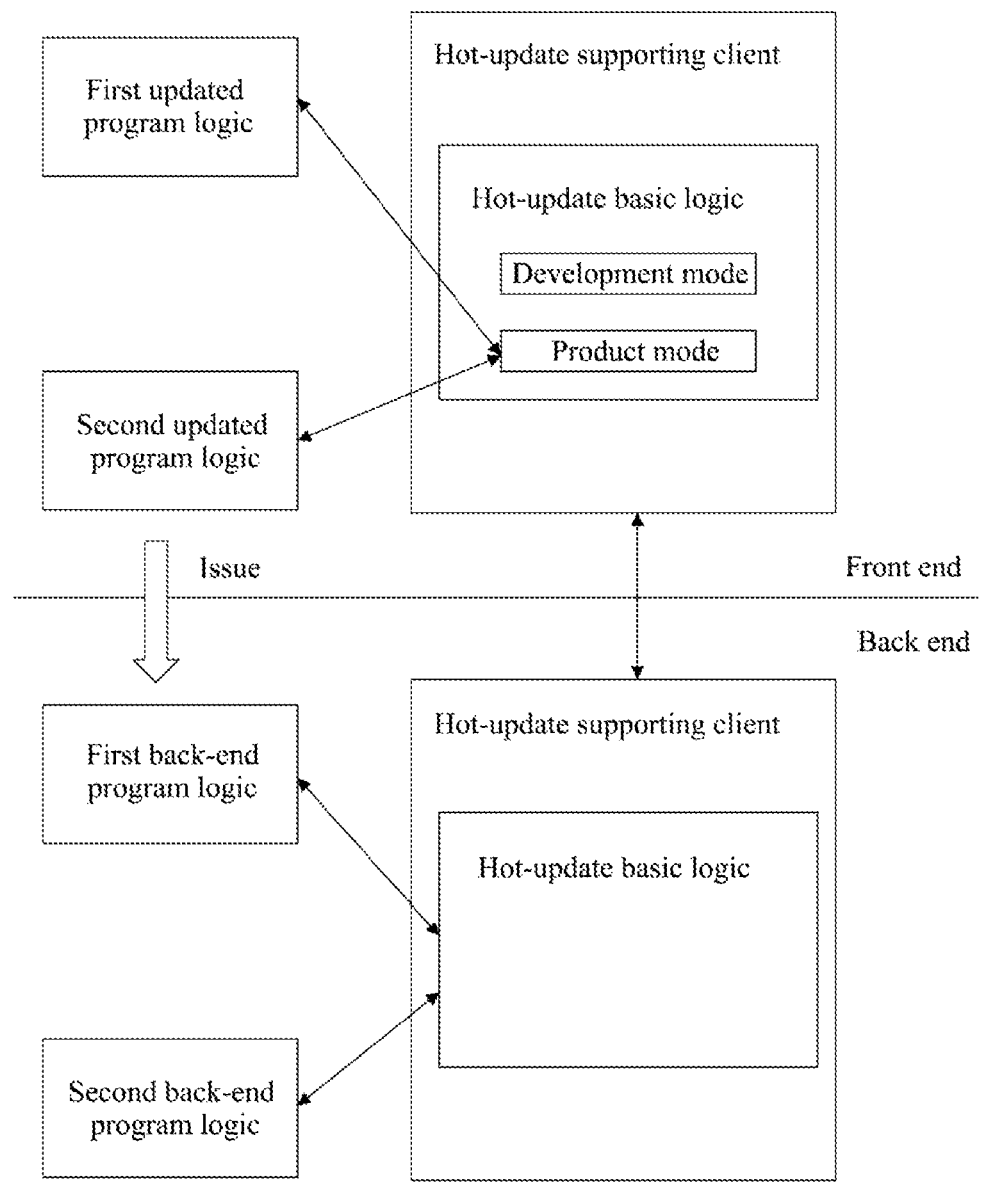
FIG. 4 is a schematic diagram of data flow in a product mode in the embodiment shown in FIG. 2.

FIG. 4 is a schematic diagram of data flow in a product mode in the embodiment shown in FIG. 2. After the front end issues the updated program logic to the back end, the updated program logic is compiled on the back end to obtain a first back-end program logic and a second back-end program logic, and the back-end program logics can run on the back end. At this time, the hot-update supporting client on the front-end is configured in the product mode, and the front end can acquire update data from the back end through the product mode of the hot-update supporting client.

In this embodiment, the to-be-updated program logic is debugged through the development mode of the hot-update supporting client to obtain the updated program logic; then the updated program logic is issued to the back end, and the update data is acquired from the back end through the product mode of the hot-update supporting client. This allows the front-end developer to write and update the logic executed on the back end simply and quickly without an assistance of any back-end developer, thereby improving an efficiency of rapid update and iteration of the application program.

In addition, the entire development and debugging process is carried out in the same original integrated development environment of the front end. The front-end developer does not need to master other new knowledge, but only needs to understand basic rules and know which codes will be executed on the back end.

Moreover, the application program updating method according to the present application can also be applied to updates of multiple versions and multiple program logics in an application. In order to make a specific description, a specific updating example can be combined for description.

There may be an application program of a version 7.0.0V1 issued on Jan. 1, 2020. According to the method provided in this embodiment, a bug was updated and fixed on Jan. 10, 2020, and the application program was updated to a version 7.0.0V2. And according to the method provided in this embodiment, it was issued together with a 7.1.0 client on Jan. 30, 2020, and affects same-name functions of all clients at the same time, and the application program was updated to a version 7.1.0V3. According to the method provided in this embodiment, a bug was updated and fixed on Feb. 5, 2020, and the application program was updated to a version 7.1.0V4.

At this time, due to the need to support more functions, on Feb. 15, 2020, in addition to updating the 7.1.0V4 version to a 7.1.0V5 version, a new version 7.2.0V1 can also be issued. Later, both the 7.1.0 version and 7.2.0 version can be updated in parallel.

Figure 5:
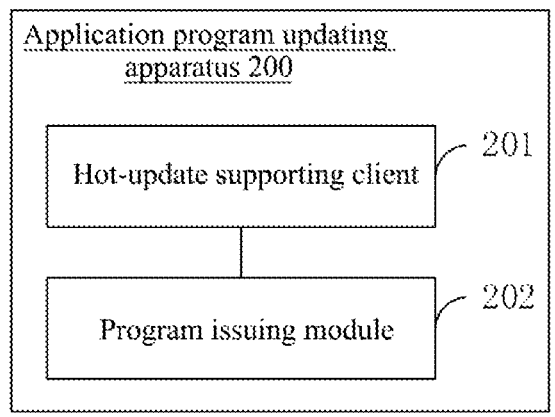
FIG. 5 is a schematic structural diagram of an application program updating apparatus according to an exemplary embodiment of the present application.

FIG. 5 is a schematic structural diagram of an application program updating apparatus according to an exemplary embodiment of the present application. As shown in FIG. 5, the application program updating apparatus 200 according to this embodiment includes:

a hot-update supporting client 201, configured to debug a to-be-updated program logic through a development mode to obtain an updated program logic;

a program issuing module 202, configured to issue the updated program logic to a back end; and the hot-update supporting client 201, further configured to acquire update data from the back end through a product mode.

In a possible design, the to-be-updated program logic is written and debugged based on an integrated development environment corresponding to the front end.

In a possible design, the to-be-updated program logic is written based on a programming language corresponding to the front end.

In a possible design, the to-be-updated program logic is a program logic to be newly added and/or a program logic to be modified.

In a possible design, the program issuing module is specifically configured to issue the updated program logic to the back end through a data interface, where the data interface is an original interface for data interaction between the front end and the back end.

It is worth noting that the application program updating apparatus according to the embodiment shown in FIG. 5 can be used to execute the steps on the front-end side of the application program updating method according to any of the above embodiments. Specific implementation and technical effects are similar, and will not be repeated here.

Figure 6:
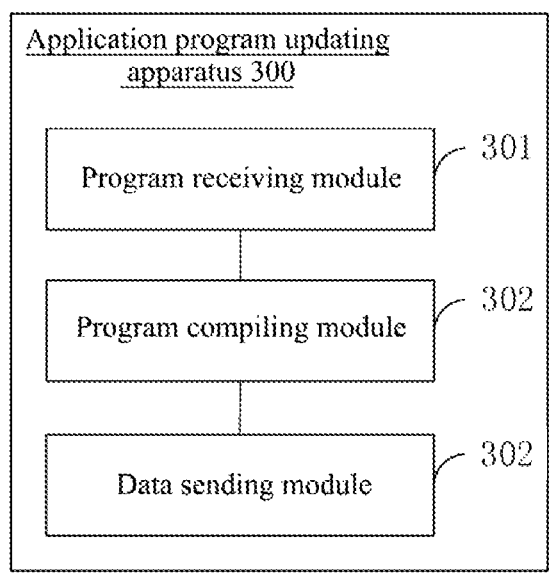
FIG. 6 is a schematic structural diagram of an application program updating apparatus according to another exemplary embodiment of the present application.

FIG. 6 is a schematic structural diagram of an application program updating apparatus according to another exemplary embodiment of the present application. As shown in FIG. 6, an application program updating apparatus 300 according to this embodiment includes:

a program receiving module 301, configured to receive a updated program logic issued by a front end;

a program compiling module 302, configured to compile the updated program logic to obtain a back-end program logic;

a data sending module 303, configured to send update data to the front end through the back-end program logic.

It is worth noting that the application program updating apparatus according to the embodiment shown in FIG. 5 can be used to execute the steps on the back-end side of the application program updating method according to any of the above embodiments. Specific implementation and technical effects are similar, and will not be repeated here.

Figure 7:
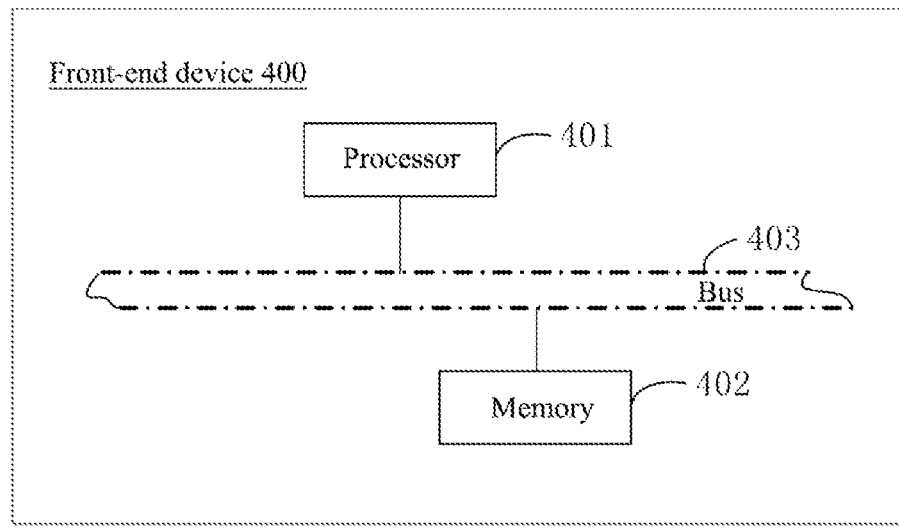
FIG. 7 is a schematic structural diagram of a front-end device according to an exemplary embodiment of the present application.

FIG. 7 is a schematic structural diagram of a front-end device according to an exemplary embodiment of the present application. As shown in FIG. 7, a front-end device 400 according to this embodiment includes:

a processor 401; and a memory 402, configured to store an executable instruction of the processor; the memory may further be a flash;

The processor 401 is configured to execute each step in the above methods by executing the executable instruction.

Optionally, the memory 402 may be independent or integrated with the processor 401.

When the memory 402 is a component independent of the processor 401, the front-end device 400 may further include:

a bus 403, configured to connect the processor 401 and the memory 402.

The embodiment further provides a readable storage medium storing a computer program therein. When the computer program is executed by at least one processor of an electronic device, the electronic device executes steps of the front end in the methods according to the above various embodiments.

The embodiment further provides a program product, which includes a computer program, and the computer program is stored in a readable storage medium. At least one processor of the electronic device can read the computer program from a readable storage medium, and at least one processor executes the computer program to enable the electronic device implement steps of the front end in the methods according to the above various embodiments.

Figure 8:
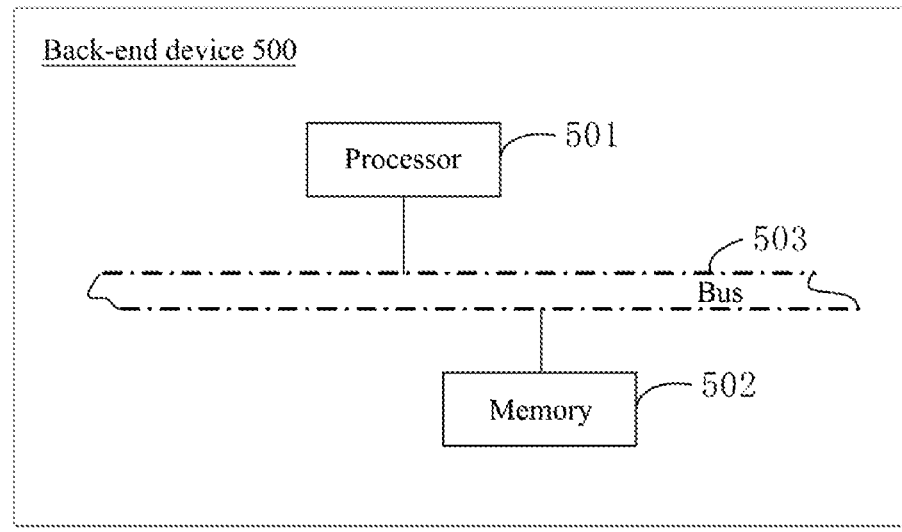
FIG. 8 is a schematic structural diagram of a back-end device according to an exemplary embodiment of the present application.

FIG. 8 is a schematic structural diagram of a back-end device according to an exemplary embodiment of the present application. As shown in FIG. 8, a back-end device 500 according to this embodiment includes:

a processor 501; and a memory 502, configured to store a computer program of the processor; the memory may further be a flash;

The processor 501 is configured to execute each step in the above methods by executing the computer program.

Optionally, the memory 502 may be independent or integrated with the processor 501.

When the memory 502 is a component independent of the processor 501, the back-end device 500 may further include:

a bus 503, configured to connect the processor 501 and the memory 502.

The embodiment further provides a readable storage medium storing a computer program therein. When the computer program is executed by at least one processor of an electronic device, the electronic device executes steps of the back end in the methods according to the above various embodiments.

The embodiment further provides a program product, which includes a computer program, and the computer program is stored in a readable storage medium. At least one processor of the electronic device can read the computer program from a readable storage medium, and at least one processor executes the computer program to enable the electronic device implement the methods according to the above various embodiments.

In addition, the embodiment further provides a front-end device according to any of the above embodiments and a back-end device according to any of the above embodiments.

Persons of ordinary skill in the art may understand that all or part of the steps in the above method embodiments may be implemented by a program instructing relevant hardware. The foregoing program may be stored in a computer readable storage medium. When the program is executed, the steps including the above method embodiments are executed. The foregoing storage medium may include a ROM, a RAM, a magnetic disk, or an optical disk and other media that can store program codes.

Finally, it should be noted that the above embodiments are merely used to describe the technical solutions of the present application other than limiting them. Although the present application is described in detail with reference to the foregoing embodiments, persons of ordinary skill in the art should understand that they may still make modifications to the technical solutions described in the foregoing embodiments or make equivalent substitutions to all or some technical features thereof. However, these modifications and substitutions do not cause the spirit of the corresponding technical solutions departing from the scope of each embodiment of the present application.

What claimed is:

1. An application program updating method, applied to a front end, comprising:
debugging a to-be-updated program logic through a development mode of a hot-update supporting client to obtain an updated program logic which is debugged on the front end, wherein the updated program logic is used to generate a back-end program logic running on a back end after being compiled by the back end;
issuing the updated program logic to the back end, so that the back end compiles the updated program logic to obtain the back-end program logic; and
acquiring update data from the back end through a product mode of the hot-update supporting client.

2. The application program updating method according to claim 1, wherein the to-be-updated program logic is written and debugged based on an integrated development environment corresponding to the front end.

3. The application program updating method according to claim 2, wherein the to-be-updated program logic is written based on a programming language corresponding to the front end.

4. The application program updating method according to claim 1, wherein the to-be-updated program logic is a program logic to be newly added and/or a program logic to be modified.

5. The application program updating method according to claim 2, wherein the to-be-updated program logic is a program logic to be newly added and/or a program logic to be modified.

6. The application program updating method according to claim 3, wherein the to-be-updated program logic is a program logic to be newly added and/or a program logic to be modified.

7. The application program updating method according to claim 1, wherein issuing the updated program logic to the back end comprises:
issuing the updated program logic to the back end through a data interface, wherein the data interface is an original interface for data interaction between the front end and the back end.

8. The application program updating method according to claim 2, wherein issuing the updated program logic to the back end comprises:
issuing the updated program logic to the back end through a data interface, wherein the data interface is an original interface for data interaction between the front end and the back end.

9. An application program updating method, applied to a back end, comprising:
receiving an updated program logic which is debugged on a front end and issued by the front end, wherein the updated program logic is used to generate a back-end program logic running on the back end after being complied by the back end;
compiling the updated program logic to obtain the back-end program logic running on the back end; and
sending update data to the front end through the back-end program logic.

10. A front-end device, comprising:
a processor; and
a memory configured to store a computer program of the processor; wherein the processor is configured to implement the application program updating method according to claim 1 by executing the computer program.

11. The front-end device according to claim 10, wherein the to-be-updated program logic is written and debugged based on an integrated development environment corresponding to the front end.

12. The front-end device according to claim 10, wherein the to-be-updated program logic is written based on a programming language corresponding to the front end.

13. The front-end device according to claim 10, wherein the to-be-updated program logic is a program logic to be newly added and/or a program logic to be modified.

14. The front-end device according to claim 10, wherein the processor is further configured to:

issue the updated program logic to the back end through a data interface, wherein the data interface is an original interface for data interaction between the front end and the back end.

15. A non-transitory computer-readable storage medium storing a computer program thereon, wherein the computer program implements the application program updating method according to claim 1 when being executed by a processor.

16. A back-end device, comprising:
a processor; and
a memory configured to store a computer program of the processor; wherein the processor is configured to implement the application program updating method according to claim 9 by executing the computer program.

17. A non-transitory computer-readable storage medium storing a computer program thereon, wherein the computer program implements the application program updating method according to claim 9 when being executed by a processor.

18. An application program updating system, comprising:
a front-end device; and
a back-end device, wherein the front-end device comprises:
a first processor; and
a first memory, configured to store a computer program of the processor; wherein the first processor is configured to:
debug a to-be-updated program logic through a development mode of a hot-update supporting client to obtain an updated program logic which is debugged on the front-end device, wherein the updated program logic is used to generate a back-end program logic running on the back-end device after being complied by the back-end device;
issue the updated program logic to the back-end device; and
acquire update data from the back-end device through a product mode of the hot-update supporting client; and wherein the back-end device comprises:
a second processor; and
a second memory, configured to store a computer program of the processor; wherein the second processor is configured to:
receive the updated program logic which is debugged on the front-end device and issued by the front-end device;
compile the updated program logic to obtain the back-end program logic running on the back-end device; and
send update data to the front-end device through the back-end program logic.

19. The application program updating method according to claim 1, wherein the issuing the updated program logic to the back end comprises:
issuing the updated program logic to the back end, so that the back end generates the back-end program logic running on the back end by compiling the updated program logic.

20. The application program updating method according to claim 1, wherein the back-end program logic executed by the back end is developed in the development mode of the hot-update support client.

\* \* \* \* \*